UNITED STATES PATENT OFFICE.

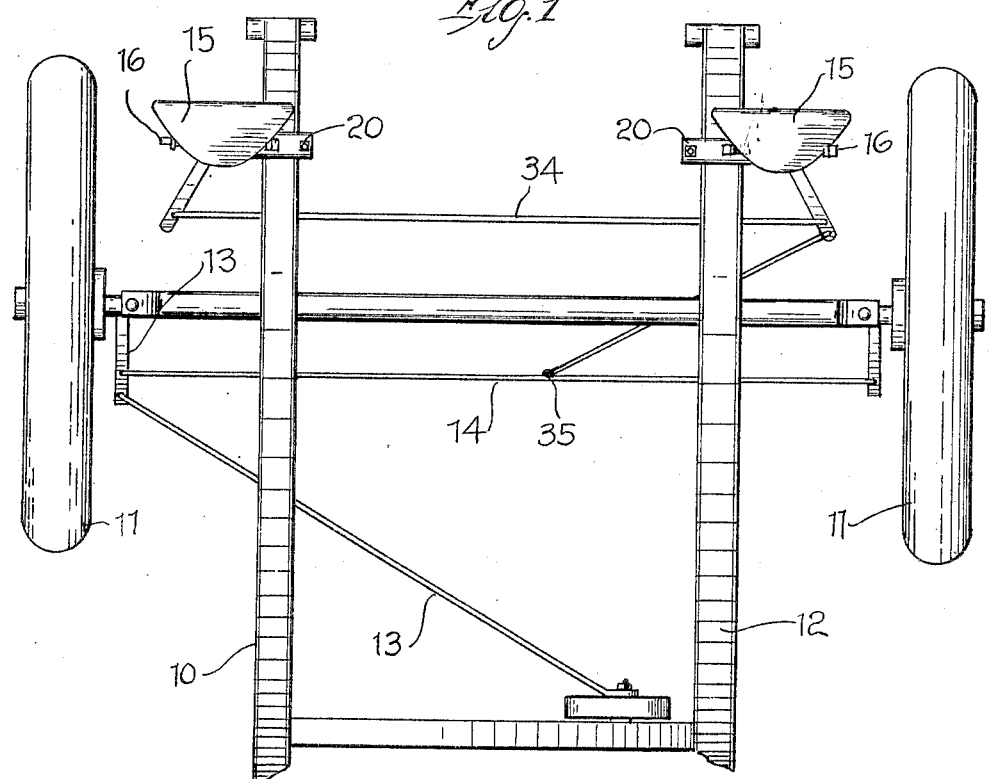
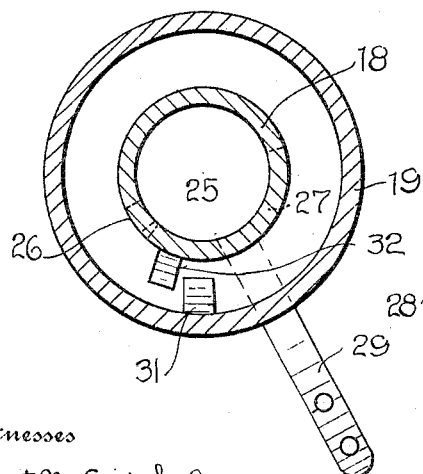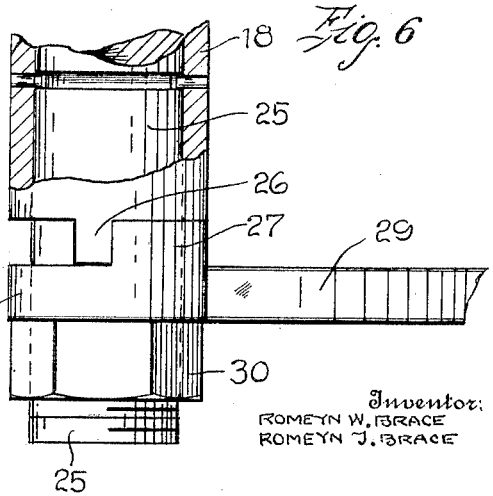

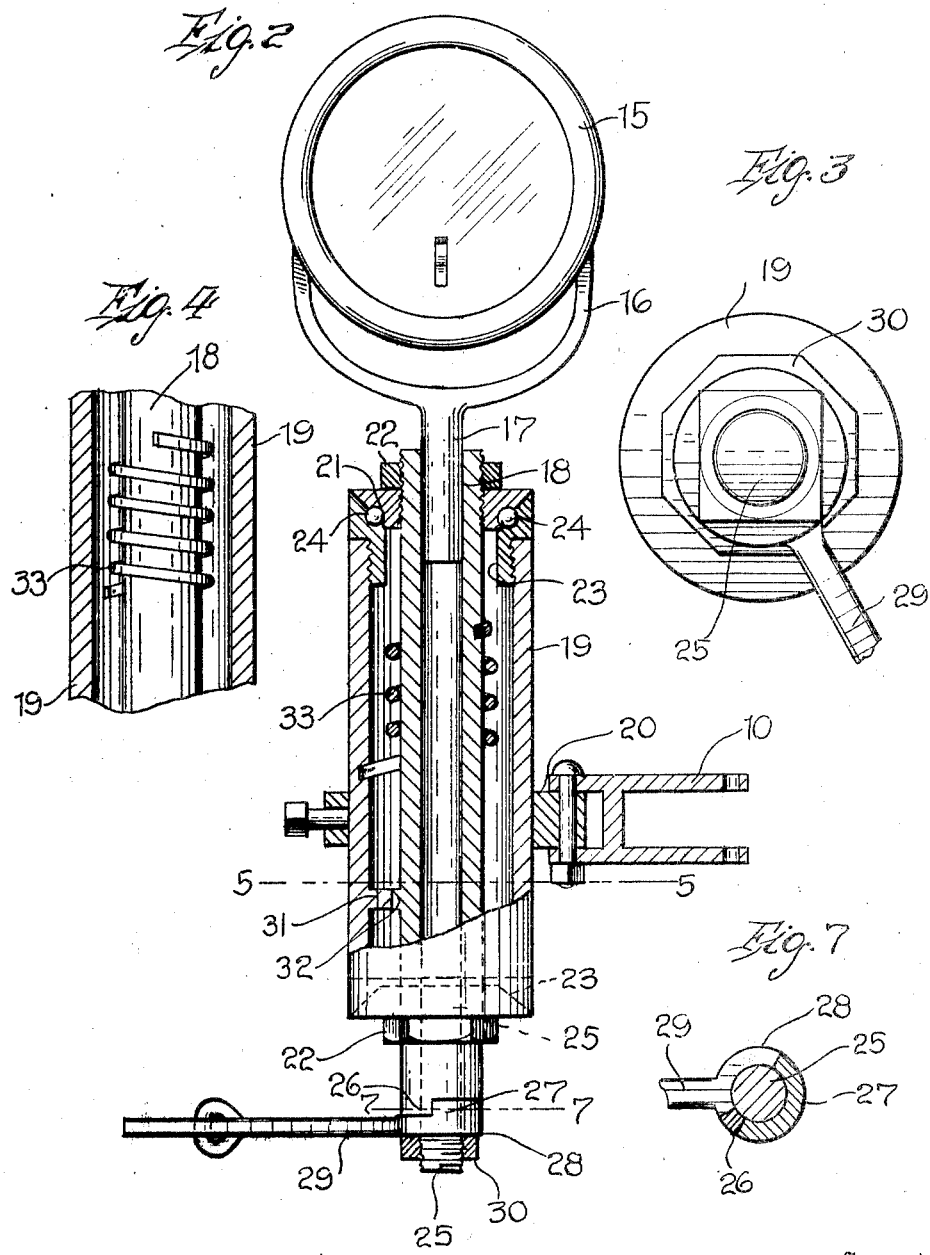

ROMEYN W. BRACE AND ROMEYN T. BRACE, OF VICTOR, NEW YORK.

HEADLIGHT-CONTROLLER.

1,068,100.　　　　　Specification of Letters Patent.　　Patented July 22, 1913.

Application filed March 1, 1913. Serial No. 751,623.

*To all whom it may concern:*

Be it known that we, ROMEYN W. BRACE and ROMEYN T. BRACE, citizens of the United States, residing at Victor, in the county of Ontario and State of New York, have invented certain new and useful Improvements in Headlight-Controllers, of which the following is a specification, reference being had to the accompanying drawings.

This invention relates to new and useful improvements in head light controllers for automobiles and other like vehicles.

An object of this invention is the provision of a head light controller so constructed as to operate the lamps in such manner that their rays will be directed in the path in which the vehicle is to travel.

Another object of this invention is the provision of means whereby one of the said lights only will be turned in the path in which the vehicle is to travel and the other will be held stationary in the path in which the vehicle is traveling.

A further object of this invention is the provision of novel means for mounting the lamps so that they will be allowed to turn only in one direction.

A still further object of this invention is to improve and simplify devices of this character, rendering them comparatively simple and inexpensive to manufacture, reliable and efficient in use, and automatically operated.

With these and other objects in view, this invention resides in the novel features of construction, formations, combinations and arrangements of parts to be hereinafter more particularly described, claimed and illustrated in the accompanying drawings, in which—

Figure 1 is a plan view of a portion of an automobile showing our invention applied. Fig. 2 is a vertical sectional view taken through one of the lamp holders. Fig. 3 is a bottom plan view of one lamp holder. Fig. 4 is a detail sectiona. view showing the means of attaching the spring. Fig. 5 is a horizontal sectional view taken on the line 5—5 of Fig. 2. Fig. 6 is a fragmentary side elevation of the lower end of the lamp holder. Fig. 7 is a longitudinal sectional view taken on the line 7—7 of Fig. 2.

Referring to the accompanying drawings by similar characters of reference throughout the several views, the numeral 10 designates a fragment of the forward portion of an automobile mounted upon the steering wheels 11.

12 designates the chassis of the automobile, while 13 shows a portion of the steering mechanism which embodies the customary connecting rod 14 through the instrumentality of which the wheels 11 are made to swing in unison.

The head lamps of the automobile are designated, as at 15, and are mounted in the customary supporting forks 16 carried by the spindles 17. These spindles 17 are mounted in the upper ends of the inner cylindrical tubes 18 which are rotatable within the outer cylindrical tubes or sleeves 19. These sleeves 19 are connected to convenient portions of the automobile frame by clamps 20 which may be of any desired construction to answer the purpose desired.

Ball races 21 are threaded upon the opposite ends of the inner tube or core 18 and are held against displacement by locking nuts 22. Corresponding ball races 23 are secured to the opposite ends of the sleeve 19 and have disposed therein ball bearings 24 which engage the before described races 21.

Spindles 25 are secured within the lower ends of the cores 18 and extend a suitable distance beyond the lower ends thereof to the lower ends of the sleeves 19. The cores 18 are formed with lugs 26 arranged to engage the stops 27 formed upon the tubular inner ends 28 of the operating levers 29. These lugs 26 and stops 27 are designed for the purpose of causing the rotation of the cores 18 when the levers 29 are swung in one direction. These levers 29 are held against displacement by locking nuts 30, which are threaded upon the lower ends of the spindles 25 and which contact with the lower ends of the tubular portions 28.

Stops 31 and 32 are formed upon the inner sides of the sleeves 19 and outer sides of the cores 18 respectively and are arranged in substantially the same horizontal plane so that upon the rotation of the core 18 within the sleeve 19, these stops 31 and 32 will contact. It should be noted in this connection that the stops 31 and 32 are so arranged as to contact when the lamps are disposed so that their rays fall in the path of the vehicle, when the same is moving in a straight line. A spring 33 is attached to the core 18 with its convolutions surrounding the same and its opposite end connected to the sleeve 19. The purpose of this spring is to yieldingly force the stops 31 and 32 into engagement.

A connecting rod 34 is pivoted at its opposite ends to the outer ends of the levers 29, while connecting one of the said levers 29 to the connecting rod 14 of the steering mechanism, is a link 35.

The operation of the device is as follows:—Assuming that the wheels 11 are arranged to guide the vehicle in a forwardly direction and it is desired to turn to the right, the connecting rod 14 is moved in the direction indicated by the arrow which causes the wheels to be turned to the right. This operation causes the link 35 to swing the levers 29 to the left which swings only the lamp at the left of the vehicle, owing to the particular arrangement of the stops 31 and 32. On account of the position of the lug 26 and stop 27, the operation of the lever 29 at the right of the vehicle will have no effect upon the movement of the lamp it is designed to operate and the rays from that lamp will be directed in advance of the vehicle in the usual manner.

From the foregoing disclosures taken in connection with the accompanying drawings, it will be manifest that an automobile head light controller is provided, which will fulfil all of the necessary requirements of such a device. It should be noted in this connection that various minor changes in the specific details of construction can be resorted to within the scope of the appended claim without departing from or sacrificing any of the advantages of the invention.

Having thus fully described this invention, what we claim as new and desire to protect by Letters Patent is:—

In an automatic head light controller, the combination with a steering mechanism of an automobile, of a sleeve carried by the automobile, a core disposed within the sleeve, an anti-friction connection between the sleeve and core, lamp supporting means secured to the core, contacting stops formed upon the core and the sleeve, a spring for yieldingly holding the stops into contact, a spindle secured to the core, a lug formed upon the core, a lever engaging the spindle, a stop formed upon the lever for engaging the lug and rotating the core, and an operative connection between the lever and the steering mechanism of the automobile.

In testimony whereof we hereunto affix our signatures in the presence of two witnesses.

ROMEYN W. BRACE.
ROMEYN T. BRACE.

Witnesses:
GEO. W. BOUGHTON,
F. E. COBB.